(12) United States Patent
Hayashita et al.

(10) Patent No.: US 6,836,513 B2
(45) Date of Patent: Dec. 28, 2004

(54) MOVING PICTURE ENCODING METHOD AND APPARATUS

(75) Inventors: Akiko Hayashita, Tokyo (JP); Yoshihiro Ueda, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 636 days.

(21) Appl. No.: 09/956,225

(22) Filed: Sep. 20, 2001

(65) Prior Publication Data

US 2002/0037049 A1 Mar. 28, 2002

(30) Foreign Application Priority Data

Sep. 22, 2000 (JP) ........................................ 2000-288452

(51) Int. Cl.[7] .............................................. H04N 7/12
(52) U.S. Cl. .............................. 375/240.12; 375/240.26
(58) Field of Search ........................ 375/240.26, 240.06, 375/240.12

(56) References Cited

U.S. PATENT DOCUMENTS 6,091,774 A * 7/2000 Hyodo et al. .......... 375/240.03
6,600,783 B1 * 7/2003 Morita et al. .......... 375/240.03

FOREIGN PATENT DOCUMENTS

JP 09-130787 5/1997

* cited by examiner

*Primary Examiner*—Chris Kelley
*Assistant Examiner*—Matthew J Haney
(74) *Attorney, Agent, or Firm*—Rabin & Berdo, P.C.

(57) ABSTRACT

Moving picture encoding method and apparatus in which deterioration in quality of a moving picture which is decoded by a decoding apparatus can be suppressed by effectively making the most of a transmission band under limitation of a transmission band of a transmission path are provided. The apparatus calculates a prediction code amount with respect to each frame constructing a moving picture. A target code amount upon encoding of the current frame is calculated on the basis of a predetermined target bit rate or code amount information regarding a preceding frame. An area to be encoded of the current frame is determined on the basis of the target code amount and the prediction code amount.

26 Claims, 2 Drawing Sheets

MOVING PICTURE ENCODING METHOD AND APPARATUS

BACKGROUND OF THE INVENTION

1. Field of the Invention

The invention relates to an encoding method and an encoding apparatus of a moving picture and, more particularly, to an encoding method and an encoding apparatus for encoding each of a plurality of frames constructing moving picture data and outputting it.

2. Related Background Arts

Services for transmitting moving pictures like a TV telephone, a portable information terminal, video-on-demand, and a digital TV broadcasting system will be widely spread.

In case of transmitting a moving picture, generally, the image is encoded in accordance with a transmission band of a transmission path. To encode the moving picture, a system such as MPEG1 or MPEG2 which is specified by the ISO or a system such as H.262, H.263, or the like which is specified by the ITU-T is used.

Usually, in case of compression encoding a moving picture, a bit rate of image data to be encoded is controlled (rate control). One of a typical method as a rate control method is a method of adjusting a frame rate in accordance with a bit rate of each frame. There is also a typical method whereby when the used bits in a certain frame is large, a bit rate is suppressed by widening a quantization size of next several frames. Further, a technique for varying an encoding frame rate in accordance with a situation is known. Such a technique has been disclosed in, for example, JP-A-9-130787.

When the encoded moving picture is transmitted, a method whereby moving picture data constructed by a plurality of continuous frames is packetized, encoded every packet, and transmitted is ordinarily used. At this time, either a method whereby codes which are generated since the whole one frame constructing the moving picture has been encoded are stored into one packet or a method whereby codes which are generated since a part of the frame has been encoded are stored is used.

There is a case where the packets do not reach a decoding apparatus side due to the loss of the packets on the transmission path or the like. In such a case, the lost portion cannot be decoded in the decoding apparatus. At this time, if the codes of one frame have been stored in the packet, the whole frame cannot be decoded. To prevent it, a method whereby the image of one frame is divided into a plurality of areas and the divided image areas are encoded and transmitted as packets (packet division) is generally used.

The packets obtained by encoding the divided image areas can be decoded without referring to other packet encoded information. Therefore, the encoded image areas can be independently decoded.

A code transmission control such that if it is determined that it is difficult to transmit the packet while a transmission rate is monitored by using such a packet dividing method, a transmitting apparatus does not transmit the packet purposely is also performed.

There is a possibility, however, that a picture quality and the frame rate become unstable and a reconstructed image becomes unnatural.

For example, according to the method of adjusting the frame rate, there is a situation such that in spite of the fact that there is a surplus capacity in a buffer on the encoding side, data is not transmitted at a certain time, thus a filter may occur on a display picture plane. According to the method of adjusting the quantization size, there is a problem such that it is difficult to accurately predict the bit rate, the picture quality of the reconstructed image becomes unstable, or a delay is caused.

In case of packetization, according to the method for controlling the transmission and non-transmission of the packet in accordance with a surplus degree of the transmission rate, a reference image which is used for encoding/decoding of the next frame in the encoding apparatus differs from that in the decoding apparatus, so that there is a problem such that it results in deterioration of the picture quality.

When the above-described techniques and subjects are summarized, in a conventional technique, an amount of data to be transmitted to the decoding apparatus through the transmission path needs to be controlled because of a limitation by the transmission band of the transmission path. More accurately, it is necessary to control a bit rate as an amount of bits of the frame which was encoded. As a control method, for example, a method by a frame dropout such that frames are thinned out, a method of adjusting the quantization width at the time of encoding the frame, or a method of forming packets including the frames and adjusting transmission timing of each packet has been well known hitherto.

According to the conventional bit rate control method, however, the transmission band of the transmission path cannot be effectively used and it is difficult to optimally use an effective band permitted for data communication in the transmission band corresponding to the bit rate of the frame.

SUMMARY OF THE INVENTION

It is an object of the invention to provide moving picture encoding method and apparatus for encoding each frame constructing a moving picture to be transmitted so as to suppress a deterioration in quality of the moving picture which is decoded by a decoding apparatus by effectively making the most of a transmission band of a transmission path under a limitation of the transmission band.

The moving picture encoding apparatus according to the invention fundamentally calculates a prediction code amount with respect to each frame constructing a moving picture. For example, a target code amount upon encoding of the current frame is calculated on the basis of a prescribed target bit rate or code amount information regarding the preceding frame. An area to be encoded in the current frame is determined on the basis of the target code amount and the prediction code amount.

When the area to be encoded is determined, whether the encoding of the current frame is performed or not can be first decided.

When it is determined that the encoding of the current frame is performed, whether the whole current frame is encoded or a partial area of the current frame is encoded can be determined on the basis of the prediction code amount. According to the encoding of the partial area, it is useful to interpolate data regarding an area which is not encoded in the current frame. When the code amount regarding the current frame exceeds a predetermined threshold value which gives the target code amount, the encoding of the current frame can be stopped.

According to the invention, there is provided a moving picture encoding apparatus for encoding moving picture data showing a moving picture every frame constructing the moving picture data and sequentially transmitting the encoded frame through a transmission path, comprising: an encoding circuit which sequentially encodes the moving picture data every frame; a memory circuit which stores a data amount after the encoding regarding a first frame encoded by the encoding circuit; a predicting circuit which predicts a data amount after the encoding regarding a second frame which will be obtained when the second frame subsequent to the first frame is encoded; a calculating circuit which calculates a target data amount which the data amount after the encoding of the second frame should not exceed at the time when the encoding circuit encodes the second frame by using a transmission band specified by the transmission path and the data amount which relates to the frame after the encoding of the first frame and was stored in the memory circuit; and a determining circuit which determines an area to be encoded in the second frame by using the data amount after the encoding regarding the second frame which was predicted by the predicting circuit and the target data amount regarding the second frame which was calculated by the calculating circuit.

In the moving picture encoding apparatus according to the invention, the determining circuit determines the area to be encoded in the second frame by using: the data amount after the encoding of the second frame which was predicted by the predicting circuit; and the target data amount for the second frame which was calculated by the calculating circuit on the basis of the transmission band of the transmission path and the data amount after the encoding of the first frame which was encoded by the encoding circuit. Thus, the encoding circuit can perform the encoding in consideration of: the predicted data amount after the encoding of the second frame of which internal factors for the second frame as a second frame itself are taken into consideration; and the target data amount for the second frame of which external factors for the second frame as transmission band of the transmission path and the data amount after the encoding of the first frame are taken into consideration. Therefore, even under the limitation of the transmission band of the transmission path or even if the available transmission band permitted for image communication changes, the transmission band can be made the most of in accordance with such a change, so that the deterioration of a quality of the moving picture after the decoding is reduced as compared with the conventional one.

According to the first aspect of the invention, there is provided a moving picture encoding apparatus for encoding moving picture data every frame constructing the moving picture data, comprising:

a packet encoding unit which encodes each frame constructing a moving picture and outputs code amount information regarding the frame;

a target code amount setting unit which receives the frame of the moving picture, calculates a prediction code amount regarding the frame on the basis of it, receives a target bit rate and the code amount information regarding the frame, and calculates a target code amount regarding the frame on the basis of them; and an encoding discriminating unit which determines whether the encoding of the frame is executed or not on the basis of the target code amount and the prediction code amount.

According to the second aspect of the invention, there is provided a moving picture encoding apparatus for encoding moving picture data every frame constructing the moving picture data, comprising:

a packet encoding unit which encodes each frame constructing a moving picture and outputs code amount information regarding the frame;

a target code amount setting unit which receives the current frame of the moving picture, calculates a prediction code amount regarding the current frame on the basis of it, receives a target bit rate and the code amount information regarding the preceding frame, and calculates a target code amount regarding the current frame on the basis of them; and an encoding discriminating unit which determines whether the encoding of the current frame is executed or not on the basis of the target code amount and the prediction code amount.

According to the third aspect of the invention, there is provided a moving picture encoding apparatus for encoding moving picture data every frame constructing the moving picture data, comprising:

a packet encoding unit which encodes each frame constructing a moving picture and outputs code amount information regarding the frame;

a code amount predicting unit which receives the current frame of the moving picture and calculates a prediction code amount regarding the current frame on the basis of it;

a target code amount setting unit which receives a target bit rate and the code amount information regarding the preceding frame and calculates a target code amount regarding the current frame on the basis of them; and an encoding discriminating unit which determines whether the encoding of the current frame is executed or not on the basis of the target code amount and the prediction code amount.

According to the fourth aspect of the invention, there is provided a moving picture encoding method of encoding moving picture data every frame constructing the moving picture data, comprising the steps of:

encoding each frame constructing a moving picture and outputting code amount information regarding the frame;

calculating a prediction code amount with respect to the frame of the moving picture;

calculating a target code amount on the basis of a target bit rate and the code amount information regarding the frame; and determining whether the encoding of each frame of the moving picture is executed or not on the basis of the target code amount and the prediction code amount.

According to the fifth aspect of the invention, there is provided a moving picture encoding method of encoding moving picture data every frame constructing the moving picture data, comprising the steps of:

encoding each frame constructing a moving picture and outputting code amount information regarding the frame;

calculating a prediction code amount with respect to the current frame of the moving picture;

calculating a target code amount regarding the current frame on the basis of a target bit rate and the code amount information regarding the preceding frame; and determining whether the encoding of the current frame is executed or not on the basis of the target code amount and the prediction code amount.

According to the sixth aspect of the invention, there is provided a moving picture encoding apparatus for encoding moving picture data every frame constructing the moving picture data, comprising:

a packet encoding unit which encodes each frame constructing a moving picture and outputs code amount information regarding the frame;

a target code amount setting unit which receives the frame of the moving picture, calculates a prediction code amount regarding the frame on the basis of it, receives a target bit rate and the code amount information regarding the frame, and calculates a target code amount regarding the frame on the basis of them; and an encoding discriminating unit which determines whether the encoding of the frame is executed or not on the basis of the target code amount and the prediction code amount, wherein when the received frame of the moving picture is an intra frame, the encoding discriminating unit encodes a predetermined area of this frame as a packet irrespective of the code amount information.

The above and other objects and features of the present invention will become apparent from the following detailed description and the appended claims with reference to the accompanying drawings.

DETAILED DESCRIPTION OF THE PREFERRED EMBODIMENTS

Figure 1:
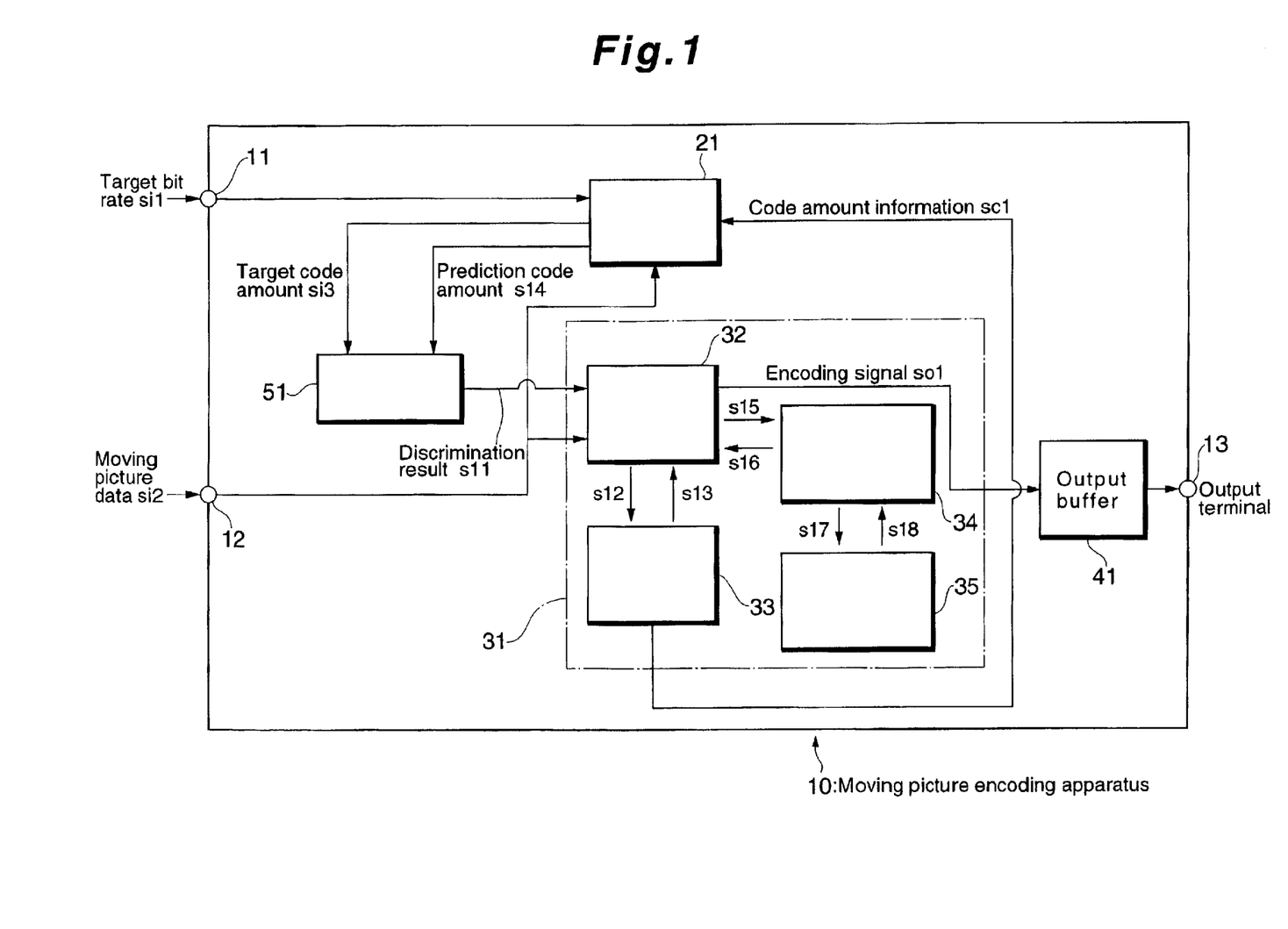
FIG. 1 is a block diagram showing a moving picture encoding apparatus according to the first embodiment.

The first embodiment of the invention will now be described hereinbelow with reference to the drawings. FIG. 1 is a block diagram showing a moving picture encoding apparatus 10 according to the first embodiment.

In this embodiment, the word "code amount" means a number of bits used for encoding the frame.

The moving picture encoding apparatus 10 has: an input terminal 11 to which a target bit rate si1 is inputted; an input terminal 12 to which moving picture data si2 to be encoded is inputted; and, further, an output terminal 13 from which an encoding signal so1 as encoded moving picture data is outputted.

The input terminal 11 is coupled to a target code amount setting unit 21. Therefore, the target bit rate si1 inputted to the input terminal 11 is applied to the target code amount setting unit 21.

The moving picture data si2 inputted to the input terminal 12 is applied to the target code amount setting unit 21 and a packet encoding unit 31. The packet encoding unit 31 generates packets by dividing a predetermined area in a frame into the packets every frame constructing the moving picture data si2. The packet includes one or more macroblocks (which will be explained in detail hereinlater) constructing each frame. The packet encoding unit 31 encodes each of the divided packets. More precisely speaking, the packet encoding unit 31 performs the encoding to each macroblock on a macroblock unit basis and, thereafter, forms the packet by using the encoded macroblock. A detailed construction of the packet encoding unit 31 will be explained hereinlater.

The moving picture data encoded by the packet encoding unit 31 is stored as an encoding signal so1 into an output buffer 41. An output of the output buffer 41 is coupled to the output terminal 13. Thus, the encoding signal so1 is sent from the output terminal 13 toward the receiving side.

The packet encoding unit 31 also outputs code amount information sc1 as a result of the encoding of the moving picture data si2. The code amount information sc1 is applied to the target code amount setting unit 21.

The target code amount setting unit 21 calculates a target code amount si3 on the basis of the target bit rate si1 and code amount information sc1. At the same time, the target code amount setting unit 21 calculates a prediction code amount s14 on the basis of the inputted moving picture data si2. An encoding discriminating unit 51 is coupled to the target code amount setting unit 21. Therefore, the target code amount si3 and prediction code amount s14 are applied to the encoding discriminating unit 51.

The encoding discriminating unit 51 determines whether the encoding of the current frame is executed or not on the basis of the supplied target code amount si3 and prediction code amount s14. When it is determined that the encoding of the current frame is executed, the encoding discriminating unit 51 further determines whether the whole current frame is encoded as a packet or the current frame is partially encoded as a packet. A discrimination result s11 is applied to the packet encoding unit 31.

The packet encoding unit 31 has: an MB encoding unit 32 for encoding the macroblock (hereinafter, referred to as an MB); a code amount discriminating unit 33 for discriminating a code amount with respect to each frame; a frame memory 34 for storing reference images; and an image interpolating unit 35 for concealing an image area which is not encoded.

The moving picture data si2 applied from the input terminal 12 is inputted to the MB encoding unit 32. Further, the discrimination result s11 of the encoding discriminating unit 51 is inputted to the MB encoding unit 32.

The MB encoding unit 32 and code amount discriminating unit 33 are bidirectionally connected. An output signal which is sent from the MB encoding unit 32 to the code amount discriminating unit 33 is defined as s12 and, contrarily, an output signal which is sent from the code amount discriminating unit 33 to the MB encoding unit 32 is defined as s13. The output signal s12 indicates a value showing a code amount of the MB which is obtained as a result of the encoding of the MB. The output signal s13 is a signal to control the encoding operation in the MB encoding unit 32.

Further, the MB encoding unit 32 and frame memory 34 are also bidirectionally connected. The frame memory 34 and image interpolating unit 35 are also bidirectionally connected. Signals which are transmitted and received between the MB encoding unit 32 and frame memory 34 are defined as s15 and s16 hereinbelow, respectively. Similarly, signals which are transmitted and received between the frame memory 34 and image interpolating unit 35 are defined as s17 and s18 hereinbelow, respectively.

The operation of the moving picture encoding apparatus 10 in the first embodiment will now be described hereinbelow also with reference to FIG. 1. The target code amount setting unit 21 calculates the target code amount si3 for the current frame on the basis of the frame rate, code amount information sc1, a transmission speed, or a remaining amount in the output buffer 41 with respect to the target bit rate si1 which is inputted to the input terminal 11.

For example, the target bit rate si1 can be also fixedly set or can be set to a value which varies in accordance with the code amount or transmission speed. In case of the variable value, the target bit rate si1 can be also supplied from some feedback means (not shown) provided in the moving picture encoding apparatus 10 or can be also properly instructed from external managing means (not shown) or the like. To calculate the target bit rate si1, the frame rate, a transmission speed, and a remaining amount in the output buffer 41 are also supplied to the target code amount setting unit 21 by a proper method although it is not shown.

It is to be noted that the code amount information sc1 which is applied to the target code amount setting unit 21 is that of the previous frame encoded by the packet encoding unit 31. That is, as a result of the encoding of a certain frame, the packet encoding unit 31 calculates the code amount information sc1 regarding the previous frame which has already been encoded and sends it to the target code amount setting unit 21. The target code amount setting unit 21 calculates the target code amount si3 for the present frame which was newly inputted on the basis of the code amount information sc1 regarding the previous frame and the target bit rate si1.

As mentioned above, the target code amount setting unit 21 calculates the prediction code amount s14 with respect to the current frame of the moving picture data si2 inputted to the input terminal 12. The target code amount si3 and prediction code amount s14 are supplied to the encoding discriminating unit 51.

The encoding discriminating unit 51 obtains two kinds of encoding discrimination threshold values th1 and th2 on the basis of the value of the target code amount si3. A method of encoding the current frame is decided by comparing those threshold values with the value of the prediction code amount s14. Those threshold values are calculated in proportion to the target code amount si3 and obtained by the following equations (1) and (2).

$$th1 = si3 \times \alpha (1 \leq \alpha) \quad (1)$$

$$th2 = si3 \times \beta (1 \leq \beta \leq \alpha) \quad (2)$$

where, $\alpha$ and $\beta$ are coefficients and set in accordance with characteristics of the transmission path or the like.

The encoding discriminating unit 51 determines the method of encoding the current frame as follows as a result of the comparison between those threshold values and the value of the prediction code amount s14. That is, (1) If the prediction code amount s14 is smaller than th2, the whole area of the current frame is encoded.

(2) If the prediction code amount s14 is equal to or larger than th2 and is equal to or less than th1, partial packet encoding for encoding only the partial image area of the current frame is executed.

(3) If the prediction code amount s14 is equal to or larger than th1, the encoding of the current frame is not executed.

The operation in the case where the encoding discriminating unit 51 determines that the partial packet encoding is executed will now be described.

The encoding discriminating unit 51 first determines a head MB position number of the image area to be encoded. The MB position number is an arbitrary value and it can be always set to a constant value or can be set to a variable value. For example, the image area can be also always encoded from the first MB or the MB position number can be also set at random in the frame, or in the case where the partial packet encoding has been performed with respect to the frames before the current frame, the MB next to the MB encoded in the previous frame can be also set to the head of the image area to be encoded.

The image area to be encoded is not limited to a single area in the frame. That is, it is possible to select encoding areas so as to encode a plurality of areas in the frame. Therefore, as a head MB position number which is determined by the encoding discriminating unit 51, there can be a plurality of numbers.

The encoding discriminating unit 51 subsequently supplies the position number of the head MB, the number of MBs to be encoded, and the number of packets to be encoded as a discrimination result s11 to the packet encoding unit 31.

If it is determined that the whole area of the current frame is encoded or the encoding of the current frame is not performed, the encoding discriminating unit 51 supplies a special signal indicative of such a fact as a discrimination result s11 to the packet encoding unit 31. By this method, an amount of data which is outputted as a discrimination result s11 can be reduced.

As another method, if it is determined that the whole area of the current frame is encoded, as a discrimination result s11, it is sufficient that the position number of the head MB, the number of MBs to be encoded, and the number of packets to be encoded mentioned above are set to values by which the whole picture plane of the current frame is shown. If it is decided that the encoding of the current frame is not performed, it is also possible to construct such that substantially no MB is designated by a method whereby all of the foregoing parameters is set to, for example, "0" as a discrimination result s11, or the like. With this construction, the same format can be used as a discrimination result s11 in any case.

The operation in the case where the packet encoding unit 31 to which the discrimination result s11 has been supplied encodes the image data will now be described.

The packet encoding unit 31 searches the MB designated by the discrimination result s11 from the divided packets. The searched MB is encoded by the MB encoding unit 32. On the other hand, the encoding is not performed to the image area of the MB which is not designated. Upon encoding, the MB encoding unit 32 uses the data of the previous frame stored in the frame memory 34 as a reference image (s16).

The frame memory 34 has memory banks corresponding to a few frames in order to store the reference image. Therefore, together with the memory bank to store the current frame under encoding as a reference image, at least one previous frame which has already been encoded is stored as a reference image into each memory bank.

With respect to the image area encoded, generated bits are outputted as an encoding signal so1. The encoding signal so1 is sent to the output buffer 41. At the same time, the MB encoding unit 32 decodes the image area which has been once encoded. Since the decoded image area is used as a reference image, it is stored into the frame memory 34 (s15).

The image interpolating unit 35 executes some concealment to the image area of the MB which is not designated by the discrimination result s11 and is not encoded. For example, the concealment is executed by a method whereby the image at the same position of the previous frame is used as it is and the image area which is not encoded in the current frame is embedded. Naturally, another concealment can be also executed. For this purpose, the image interpolating unit 35 reads out the reference image of the previous frame stored in the frame memory 34 (s17) and uses it for concealment of the image area of the MB which is not encoded in the current frame (s18). The image area concealed by the image interpolating unit 35 as mentioned above is also stored into the frame memory 34.

The MB encoding unit 32 supplies a generated code amount to the code amount discriminating unit 33 with respect to the encoded MB (s12).

Each time the generated code amount is supplied with respect to the current frame under encoding, the code amount discriminating unit 33 adds its value and calculates a total code amount. Each time it is calculated, whether the total code amount has reached a threshold value th3 or not is discriminated.

The threshold value th3 is set to an arbitrary value which is equal to or less than the target code amount si3. It is desirable to set the threshold value th3 to a value which is equal to the target code amount si3 so that the total code amount is equal to the target code amount.

If the total code amount does not reach the threshold value th3, the packet encoding unit 31 can also encode the MB other than the MB designated by the discrimination result s11. If the total code amount reaches or exceeds the threshold value th3, the encoding is stopped. In this case, the code amount discriminating unit 33 sends the output signal s13 to the MB encoding unit 32. At a point when the output signal s13 is received, the MB encoding unit 32 stops the subsequent encoding operation.

With respect to the MB which is being encoded at a point when the total code amount reaches the threshold value th3, a control such that after completion of the encoding of such an MB, the encoding operation regarding the subsequent MBs is stopped is considered, or a control such that an encoding result is not outputted also with respect to the MB which is being encoded is also considered. In this case, the result which has been being encoded on the halfway is abandoned. It is sufficient to properly select either of those controls.

At a point when the encoding of the current frame is finished as mentioned above, the packet encoding unit 31 sends the code amount information sc1 regarding the current frame to the target code amount setting unit 21 in order to set the target code amount si3 of the next frame.

If it is determined that the encoding of the current frame is not performed, the encoding of this frame is skipped. In this case, whether the encoding is executed or not is discriminated with respect to the next frame which is inputted to the input terminal 12. In this case, however, since the current frame is not encoded, the code amount information regarding the current frame cannot be calculated. Therefore, the target code amount setting unit 21 subsequently calculates the target code amount si3 on the basis of the code amount information sc1 of the previous frame. By repeating the above operations, the encoding of each frame constructing the moving picture data is executed.

With respect to the image area which is not encoded, some concealment is executed as a packet loss on the decoding apparatus side and an image is displayed. Although a method of the concealment is not particularly limited, it is desirable to use a method similar to the concealing method in the encoding apparatus. For example, the concealment is performed by a method of copying the image at the same position in the previous frame as it is.

According to the first embodiment as mentioned above, when the target code amount of the frame to be encoded is set to a small value, only the partial image area in the frame is encoded as a packet. Therefore, the generation code amount of the frame can be adjusted. In this control, unlike the control of adjusting the code amount by changing the quantization width, a predetermined picture quality can be maintained. Since the generation code amount of the image area which the user does not want to encode is equal to zero, the efficient encoding is performed. Further, since the code amount is discriminated after completion of the encoding of each MB, codes of an amount that is very close to the target code amount si3 can be generated. Therefore, the target bit rate si1 is effectively used and the encoding of the image in which the picture quality of each frame or in the frame is not changed due to the change in quantization width can be executed.

According to the encoding method in the first embodiment, the position of the packet which is transmitted by the encoding apparatus is determined unlike the transmitting method of discriminating whether each packet is transmitted in accordance with the target code amount or communicating rate upon transmission of the code or not. Therefore, even in the encoding apparatus, some concealment is executed to the portion which is not transmitted. By executing the concealment even in the encoding apparatus as mentioned above, a coincidence degree with the reference image of the decoding apparatus is raised and the image of a high quality can be obtained without deteriorating the picture quality.

Figure 2:
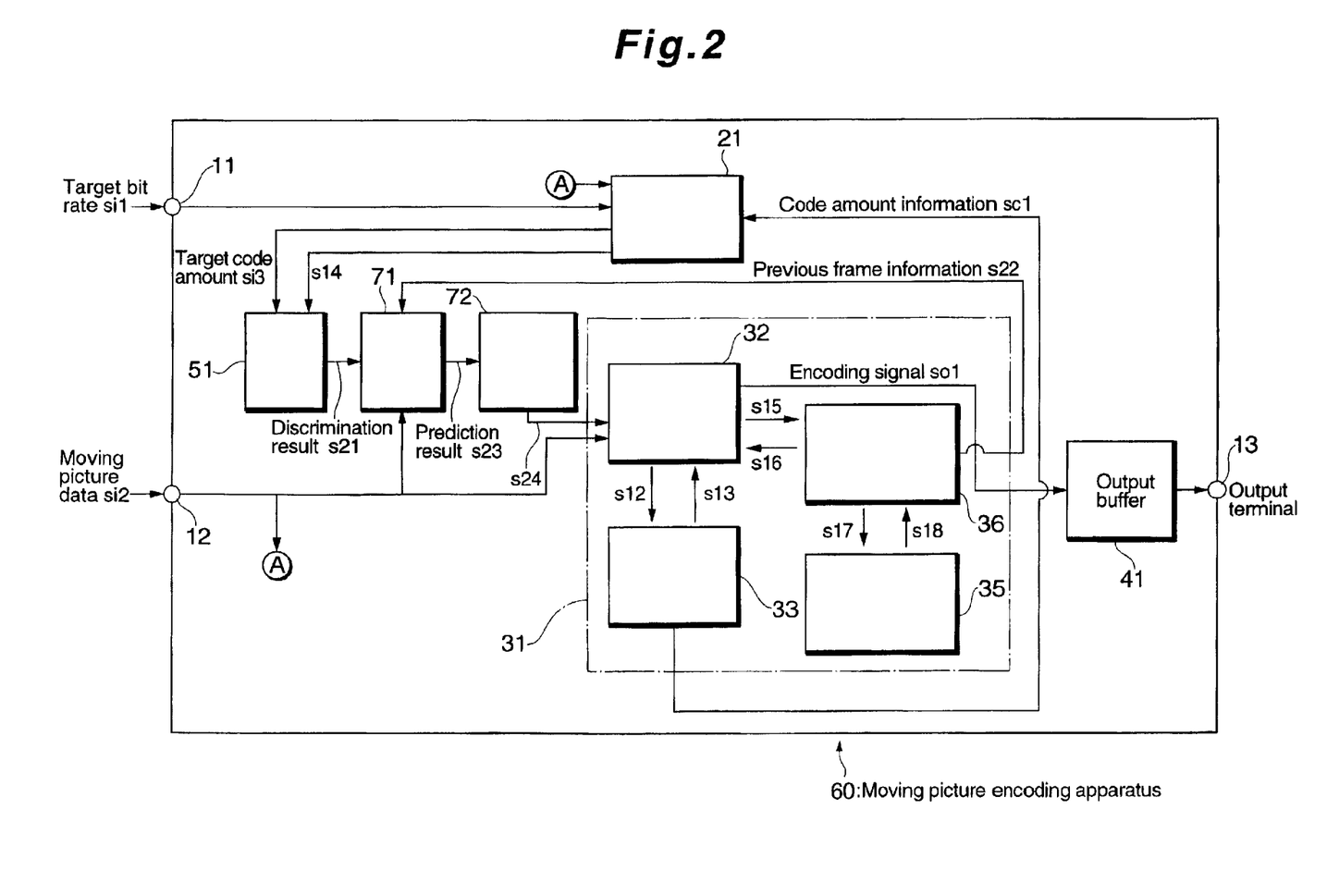
FIG. 2 is a block diagram showing a moving picture encoding apparatus according to the second embodiment.

The second embodiment of the invention will now be described. FIG. 2 is a block diagram showing a moving picture encoding apparatus 60 in the second embodiment of the invention.

A code amount predicting unit 71 is arranged at the post stage of the encoding discriminating unit 51. The moving picture data si2 is sent to the code amount predicting unit 71 and, at the same time, a discrimination result s21 is sent from the encoding discriminating unit 51. Previous frame information s22 is further supplied to the code amount predicting unit 71 from a previous frame information storing unit 36. The code amount predicting unit 71 obtains a prediction result s23 on the basis of the moving picture data si2 and previous frame information s22. The prediction result s23 is sent to a block position determining unit 72. An output of the block position determining unit 72 is supplied to the MB encoding unit 32 in the packet encoding unit 31.

In a manner similar to the first embodiment, the target bit rate si1 and the code amount information sc1 of the previous frame are supplied to the target code amount setting unit 21. On the basis of those information, the target code amount setting unit 21 calculates the target code amount si3 and sends it to the encoding discriminating unit 51. The target code amount setting unit 21 calculates the prediction code amount s14 and sends it to the encoding discriminating unit 51.

The encoding discriminating unit 51 determines whether the encoding of the current frame is executed or not on the basis of the supplied target code amount si3 and prediction code amount s14. This operation is similar to that in the first embodiment and the discrimination result s21 is transferred to the code amount predicting unit 71.

The code amount predicting unit 71 predicts a generated code amount with respect to each MB of the current frame on the basis of the discrimination result s21 and the previous frame information s22 sent from the previous frame information storing unit 36. The previous frame information s22 includes the image data of the previous frame and a characteristics amount and the generated code amount of the image of each MB which are obtained when a motion detection is performed in the MB encoding unit 32. For example, as a characteristics amount, the SAD (: Sum of Absolute Differences; the sum of absolute values of differences between the respective pixels and the previous frame pixel regarding each pixel) or the like is used. The more accurate prediction can be also made by using the image data of the previous frame. The generated code amount predicted by the code amount predicting unit 71 is sent as prediction result s23 to the block position determining unit 72.

The block position determining unit 72 to which the prediction result s23 was sent determines which MB is encoded. If the encoding discriminating unit 51 determines that the whole current frame is encoded, the block position determining unit 72 designates all MBs as targets to be encoded and sends them as block position information s24 to the MB encoding unit 32.

If the encoding discriminating unit 51 determines that a part of the current frame is encoded, the block position determining unit 72 determines the MB to be encoded and sends it as block position information s24 to the MB encoding unit 32. The block position determining unit 72 determines the position of the MB to be encoded on the basis of the prediction generation code amount of each MB of the prediction result s23 so as not to exceed the target code amount si3.

The packet encoding unit 31 encodes the MB on the basis of the block position information s24 sent from the block position determining unit 72. In a manner similar to the first embodiment, in the process which is executed in the MB encoding unit 32, the encoding is executed every MB while discriminating the generation code amount, and some concealment is executed to the area which is not encoded. According to the processes in the second embodiment, however, for the purpose of predicting the code amount of the next frame, the number of encoded MBs, the SAD of each MB, the generation code amount of each MB, or the like is stored into the previous frame information storing unit 36. That is, the previous frame information storing unit 36 in the second embodiment is constructed by adding areas for storing those various information to the frame memory 34 in the first embodiment.

Also, according to the second embodiment as mentioned above, whether the whole frame is encoded or a part in the frame is encoded is determined in accordance with the target code amount of the frame. Therefore, effects similar to those in the first embodiment are also obtained in the second embodiment. According to the second embodiment, in addition to it, the previous frame information is referred to upon determination of the MB to be encoded. Therefore, for example, a portion of a large motion in the frame to be encoded or the like can be limited and encoded. If a target with a motion exists, consequently, only the area of such a target or the area around the target as a center can be encoded, so that a reconstructed image of a smooth motion can be obtained. When the target code amount si3 is small, by encoding the portion which was predicted such that the generation code amount is small as a center, the generation code amount can be suppressed.

As mentioned above, if the encoding is executed with respect to the portion with a motion or the portion without a motion as a center, a time-dependent lag at a boundary between the encoded packet portion and the packet portion which is not encoded on the screen is not so largely sensed. A natural image can be obtained.

As methods of encoding the moving picture data, it is well known that there are two kinds of methods such as intra frame (in the frame) encoding and inter frame (between the frames) encoding. In the second embodiment, in case of performing the intra frame encoding to the moving picture data si2, the following control can be performed.

That is, since a motion compensation is not performed upon intra frame encoding, the generation code amount in each MB does not depend on the code amount of the previous frame or the motion information thereof. Therefore, the encoding discrimination based on the target code amount si3 obtained on the basis of the generated code amount of the previous frame is not made but the partial packet encoding is executed with regard to all of the intra frames.

Specifically speaking, in case of performing the intra frame encoding, the block position determining unit 72 determines whether the encoding is executed with respect to which one of the MBs in the frame or not. A discrimination result is supplied as block position information s24 to the packet encoding unit 31. In response to it, the packet encoding unit 31 executes the encoding every MB while comparing the generation code amount with the threshold value th3. With respect to the MB which is not encoded, the concealment is performed by the image interpolating unit 35.

When the intra frame encoding which generates a much larger amount of codes as compared with that of the inter frame encoding is executed, by specifying an image area smaller than the whole frame and encoding only this area, the generated code amount is suppressed and the encoding can be performed by the code amount suitable for the target bit rate of the transmission path. In case of the moving picture transmission at a short delay, therefore, the delay of the display of the intra frame can be also reduced on the decoding side. Since the encoding of the inter frame subsequent to the intra frame can be also almost constantly performed for the target frame rate, the reconstructed image becomes a natural moving picture.

According to the second embodiment, the encoding can be performed without changing the quantization size or the encoding can be also performed while the quantization size is changed in accordance with the prediction code amount. In case of changing the quantization size, the quantization size is changed in accordance with the prediction code amount in the code amount predicting unit 71. If the quantization size is set to a large value, when the partial packet division encoding in the second embodiment is executed, the encoding of a larger area can be performed.

According to the moving picture encoding apparatus of the invention as mentioned above, the encoding circuit performs the encoding by comparing the predicted data amount after the encoding of the second frame with the target data amount for the second frame. Therefore, even if the bit rate of the transmission path is limited, the bit rate can be made the most of, so that the deterioration of the quality of the moving picture after the decoding can be suppressed as compared with the conventional one.

The present invention is not limited to the foregoing embodiments but many modifications and variations are possible within the spirit and scope of the appended claims of the invention.

What is claimed is:

1. A moving picture encoding apparatus for encoding moving picture data, the moving picture data contains a plurality of picture frame:

a packet encoding unit which encodes each frame constructing a moving picture and outputs code amount information regarding said frame;

a target code amount setting unit which receives the frame of said moving picture, calculates a prediction code amount regarding said frame, receives a target bit rate and said code amount information regarding said frame, and calculates a target code amount regarding said frame on the basis of them; and an encoding discriminating unit which determines whether the encoding of said frame is executed or not on the basis of said target code amount and said prediction code amount.

2. A moving picture encoding apparatus for encoding moving picture data, the moving picture data contains a plurality of picture frame:
   a packet encoding unit which encodes each frame constructing a moving picture and outputs code amount information regarding said frame;
   a target code amount setting unit which receives a current frame of said moving picture, calculates a prediction code amount regarding said current frame, receives a target bit rate and said code amount information regarding a previous frame, and calculates a target code amount regarding said current frame on the basis of them; and
   an encoding discriminating unit which determines whether the encoding of said current frame is executed or not on the basis of said target code amount and said prediction code amount.

3. An apparatus according to claim 2, wherein every frame constructing said moving picture data, said packet encoding unit encodes a predetermined area in said frame as a packet.

4. An apparatus according to claim 3, wherein in case of encoding said current frame, said encoding discriminating unit determines whether a whole area of said current frame is encoded or a partial area of said current frame is encoded on the basis of said prediction code amount.

5. An apparatus according to claim 4, wherein if it is determined that said current frame is partially encoded, said encoding discriminating unit instructs said packet encoding unit about an area to be encoded.

6. An apparatus according to claim 5, wherein said packet encoding unit interpolates data regarding a portion which is not encoded in said current frame.

7. An apparatus according to claim 3, wherein said packet encoding unit monitors a code amount regarding said current frame and stops the encoding of said frame when said code amount exceeds a predetermined threshold value with respect to said target code amount.

8. An apparatus according to claim 3, wherein said packet encoding unit has a macroblock encoding unit which divides each frame constructing said moving picture data into macroblocks and executes the encoding every said macroblock.

9. An apparatus according to claim 8, wherein said packet encoding unit has a code amount discriminating unit which calculates a code amount with respect to each of said macroblock, obtains a code amount regarding the frame, and outputs said code amount information.

10. An apparatus according to claim 9, wherein in case of encoding said current frame, said encoding discriminating unit determines with respect to which one of said macroblocks the encoding is executed on the basis of said prediction code amount.

11. An apparatus according to claim 10, wherein said packet encoding unit has a memory unit which stores encoding data regarding said previous frame, and
   data regarding the macroblock which is not encoded in said current frame is concealed by the data stored in said memory unit.

12. An apparatus according to claim 8, wherein said packet encoding unit obtains a generation code amount with respect to each of said macroblocks, accumulates the generation code about of every said macroblock, and
   stops the encoding of said frame when an accumulated value exceeds a predetermined threshold value with respect to said target code amount.

13. A moving picture encoding apparatus for encoding moving picture data, the moving picture data contains a plurality of picture frame:
   a packet encoding unit which encodes each frame constructing a moving picture and outputs code amount information regarding said frame;
   a code amount predicting unit which receives a current frame of said moving picture and calculates a prediction code amount regarding said current frame;
   a target code amount setting unit which receives a target bit rate and said code amount information regarding a preceding frame and calculates a target code amount regarding said current frame; and
   an encoding discriminating unit which determines whether the encoding of said current frame is executed or not on the basis of said target code amount and said prediction code amount.

14. An apparatus according to claim 13, further comprising a position determining unit which determines which area of said current frame is encoded on the basis of said prediction code amount.

15. A moving picture encoding method of encoding moving picture data every frame constructing said moving picture data, comprising the steps of:
   encoding each frame constructing a moving picture and outputting code amount information regarding said frame;
   calculating a prediction code amount with respect to the frame of said moving picture;
   calculating a target code amount on the basis of a target bit rate and said code amount information regarding the frame; and
   determining whether the encoding of each frame of said moving picture is executed or not on the basis of said target code amount and said prediction code amount.

16. A moving picture encoding method of encoding moving picture data every frame constructing said moving picture data, comprising the steps of:
   encoding each frame constructing a moving picture and outputting code amount information regarding said frame;
   calculating a prediction code amount with respect to a current frame of said moving picture;
   calculating a target code amount regarding said current frame on the basis of a target bit rate and said code amount information regarding a preceding frame; and
   determining whether the encoding of said current frame is executed or not on the basis of said target code amount and said prediction code amount.

17. A method according to claim 16, further comprising the step of:
   in case of encoding said current frame, determining whether a whole area of the current frame is encoded or a partial area of the current frame is encoded on the basis of said prediction code amount.

18. A method according to claim 17, further comprising the step of:
   interpolating data regarding a portion which is not encoded in said current frame.

19. A method according to claim 18, further comprising the steps of:
   monitoring a code amount regarding said current frame; and
   stopping the encoding of said frame when said code amount exceeds a predetermined threshold value with respect to said target code amount.

20. A moving picture encoding apparatus for encoding moving picture data every frame constructing said moving picture data, comprising:

a packet encoding unit which encodes each frame constructing a moving picture and outputs code amount information regarding said frame;

a target code amount setting unit which receives the frame of said moving picture, calculates a prediction code amount regarding said frame, receives a target bit rate and said code amount information regarding said frame, and calculates a target code amount regarding said frame on the basis of them; and an encoding discriminating unit which determines whether the encoding of said frame is executed or not on the basis of said target code amount and said prediction code amount, wherein when the received frame of said moving picture is an intraframe, said encoding discriminating unit encodes a predetermined area of said frame as a packet irrespective of said code amount information.

21. A moving picture encoding apparatus for encoding moving picture data showing a moving picture every frame constructing said moving picture data and sequentially transmitting said encoded frames through a transmission path, comprising:

an encoding circuit which sequentially encodes said moving picture data every said frame;

a memory circuit which stores a data amount after the encoding regarding said first frame encoded by said encoding circuit;

a predicting circuit which predicts a data amount after the encoding regarding said second frame which will be obtained when the second frame subsequent to said first frame is encoded;

a calculating circuit which calculates a target data amount which the data amount after the encoding of said second frame should not exceed at the time when said encoding circuit encodes said second frame by using a transmission path which is specified by said transmission band and said data amount regarding said frame after the encoding of said first frame which was stored in said memory circuit; and a determining circuit which determines an area to be encoded in said second frame by using said data amount after the encoding regarding said second frame which was predicted by said predicting circuit and said target data amount regarding said second frame which was calculated by said calculating circuit.

22. An apparatus according to claim 21, wherein each of said frames has a plurality of macroblocks, and said determining circuit determines said area to be encoded on said macroblock unit basis.

23. An apparatus according to claim 22, wherein said determining circuit determines the macroblocks of the number that is determined by said target data amount as said areas to be encoded.

24. An apparatus according to claim 23, wherein said determining circuit determines that the encoding of each of said macroblocks should be performed in accordance either an intra frame encoding method or an inter frame encoding method.

25. An apparatus according to claim 23, wherein for the purpose of concealing, as a macroblock other than said second macroblock in which said determining circuit determines that it should be encoded, said encoding circuit uses the macroblock which is included in the third frame locating just before said first frame and corresponds to said another macroblock of said first frame.

26. An apparatus according to claim 23, wherein while said macroblock of said second frame in which said determining circuit determines that it should be encoded is encoded, said encoding circuit discriminates whether the data amount of the macroblock which has already been encoded exceeds said target data amount or not.

* * * * *